Patented Nov. 12, 1940

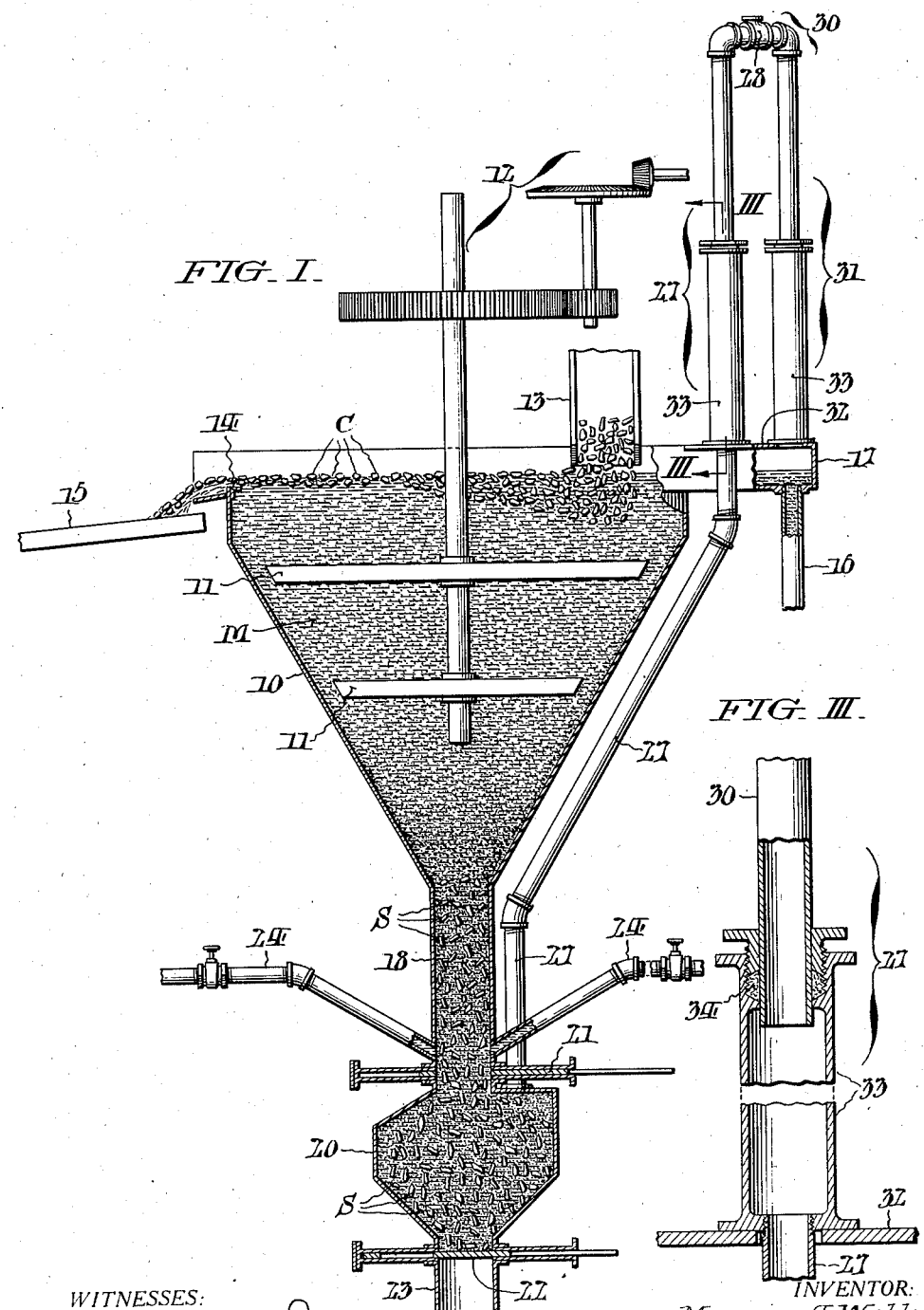

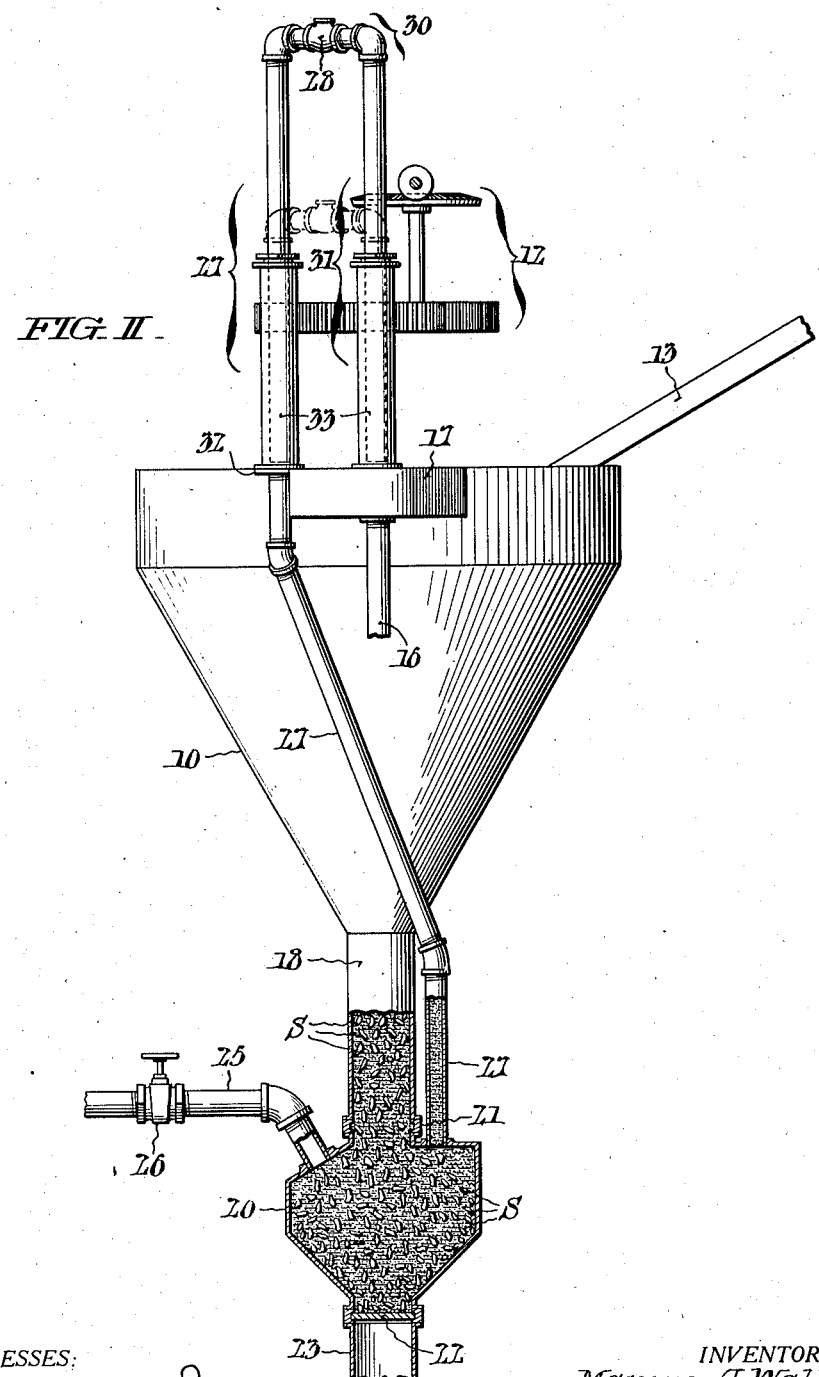

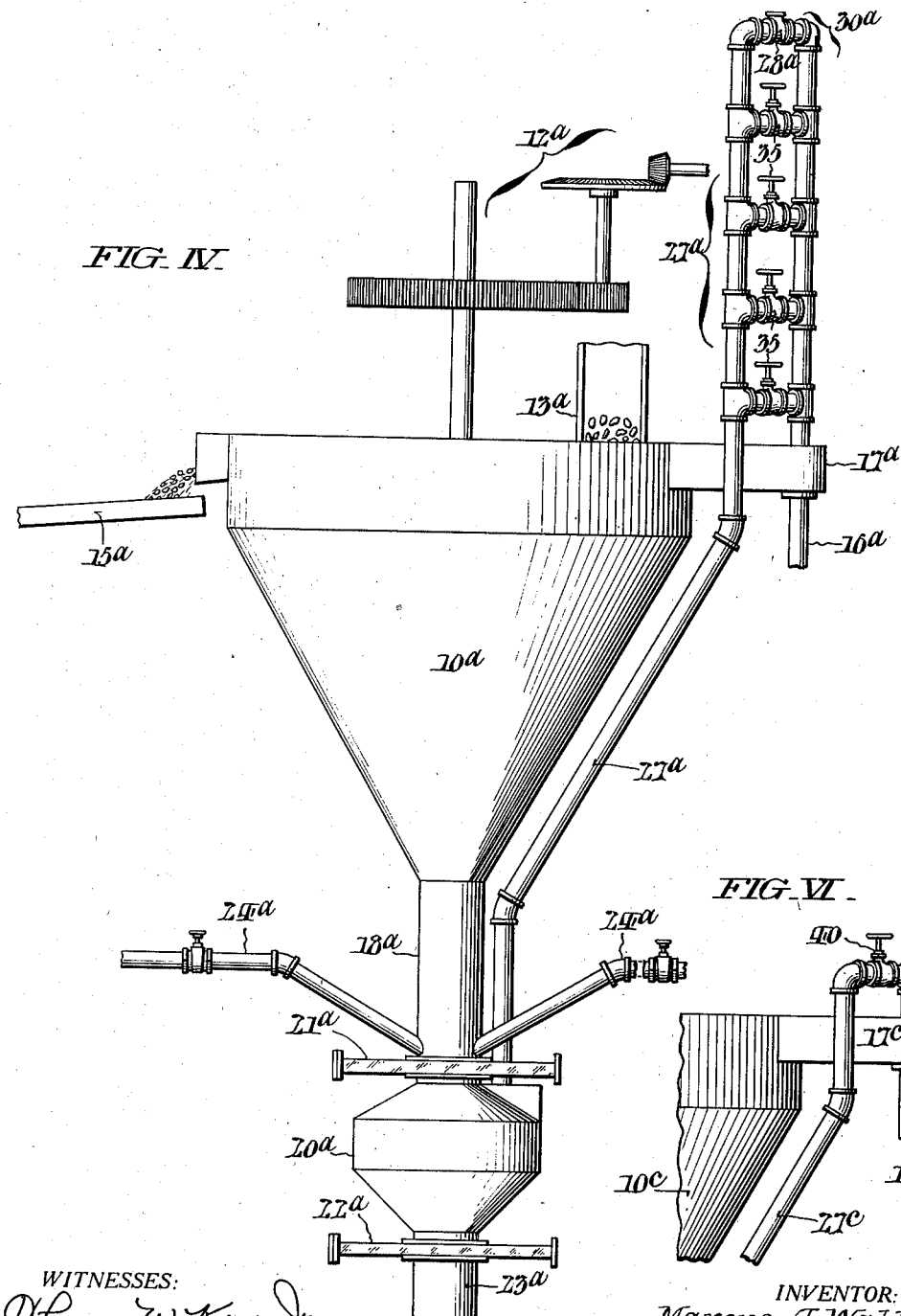

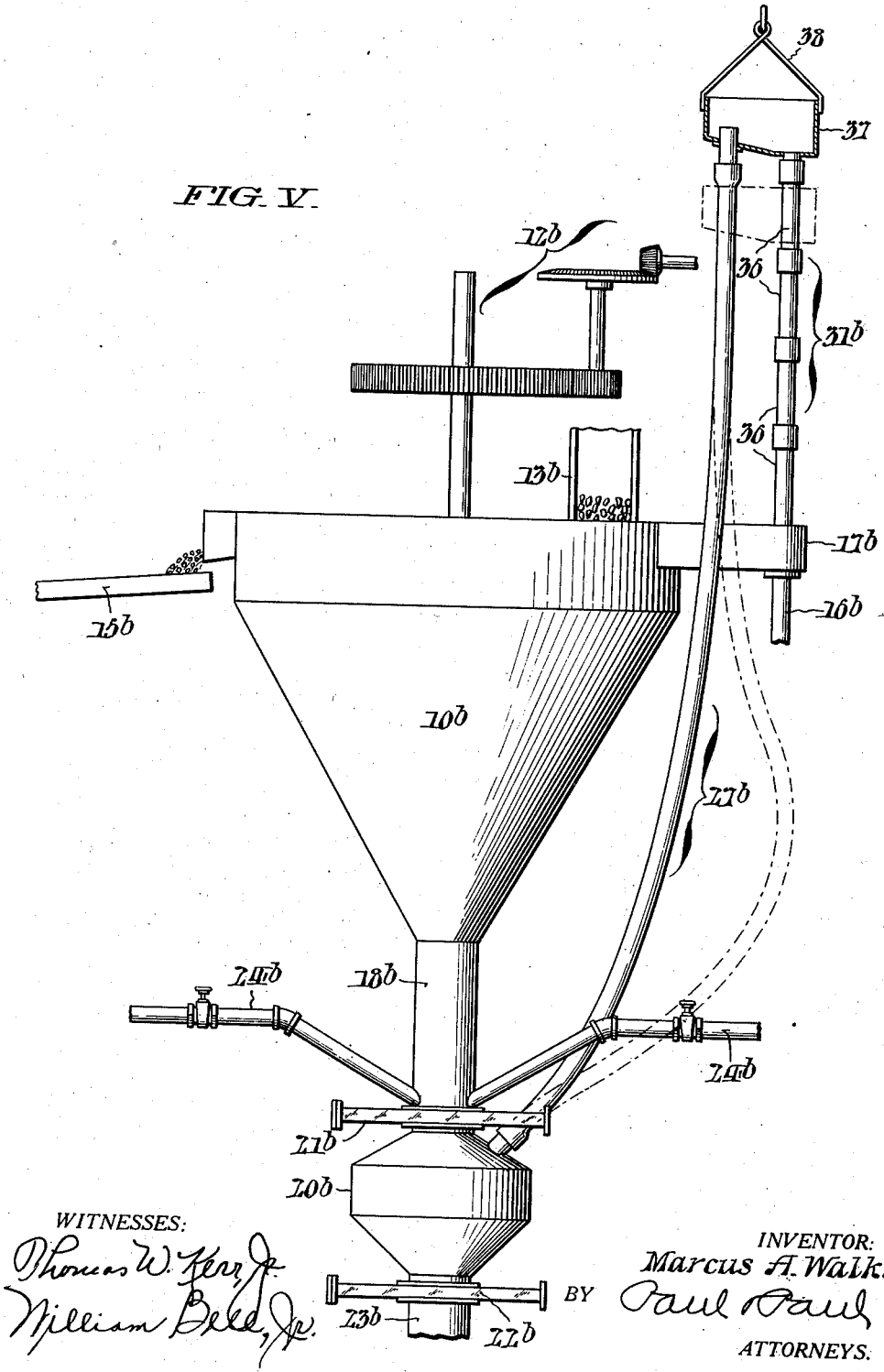

2,220,925

UNITED STATES PATENT OFFICE 2,220,925

SEPARATION OF MATERIALS OF DIFFERENT SPECIFIC GRAVITIES

Marcus A. Walker, Scranton, Pa., assignor to himself and Provident Trust Company of Philadelphia, Philadelphia, Pa., a corporation of Pennsylvania, as trustees under the will of Thomas M. Chance, deceased Application August 16, 1938, Serial No. 225,100

9 Claims. (Cl. 209—173)

This invention relates to the separation of materials of different specific gravities by the aid of a fluid medium or liquid of such specific gravity that the lighter material stays at its surface, while the heavier material sinks to the bottom. Such methods are used especially for separating coal from heavier mineral matter, usually with a mixture of sand and water as a liquid separation medium. The sand being more or less uniformly distributed in the water, by agitation, in a suitable vessel or hopper, the mingled broken coal and refuse material are run in at the top. The coal, being lighter than the sand-and-water mixture, floats at its surface, and is continually withdrawn from an outlet at the top of the vessel. The heavier refuse sinks and accumulates in the bottom of the vessel, whence it is periodically withdrawn through a suitably controlled discharge.

In the operation of such a system, the larger particles of refuse are very successfully separated and discharged; but it is found, especially in treating materials having a wide diversity in particle size, that there may be improvement. For reasons which I shall explain hereinafter, these smaller particles of refuse sometimes tend to remain behind in the apparatus when the discharge is opened, instead of passing out along with the larger particles. As this occurs at every discharge, the fine particles accumulate and work upward in the sand and water mixture, thus altering the characteristics of the separation medium. The small particles of refuse also mingle with and contaminate the coal particularly where the smaller sizes of coal are being cleaned.

I aim to improve the operation of such a system and to assure substantially complete and uniform separation of all particles of refuse or heavy material from the lighter material or coal, particularly where substantial differences in particle size prevail. I have hereinafter explained my invention in connection with one type and form of separating apparatus now in commercial use for separating refuse from coal; but it will be understood that this apparatus and use are only illustrative, and that the invention can be carried out in connection with other separating apparatus, and by means different from those illustrated and hereinafter described. Various features and advantages of the invention (besides that already referred to) will appear from the following description of particular species or forms of embodiment, and from the drawings.

In the drawings, Fig. I is a side view of a separating apparatus adapted for the practice of my invention, certain parts being shown in vertical mid-section.

Fig. II is a similar view at right angles to Fig. I, also with parts in vertical section.

Fig. III is a fragmentary view (mainly sectional) on a larger scale, illustrating a structural detail.

Fig. IV is a side view of a separating apparatus illustrating a different species or form of embodiment of my invention.

Fig. V is a similar view, illustrating still another form.

Fig. VI is a fragmentary side view corresponding to Fig. IV, but illustrating yet another form of embodiment of the invention.

Figs. I and II show a separating apparatus comprising a conical hopper-like vessel 10 containing the liquid separating medium M, of sand and water, and equipped with a revolving paddle agitator 11, driven from any suitable source of power through reduction gearing 12. The mingled coal and refuse is supplied by a gravity chute 13 terminating, as shown, just above the surface of the liquid medium M. The lumps or particles of coal C float at the top of the liquid medium M, and are withdrawn continually at an overflow outlet or weir 14,—as shown, on to a screen 15. Any sand (and water) passing off at the outlet 14 may be separated from the coal C and (ultimately) returned to the vessel 10, as through a pipe 16 connected to a lateral extension 17 of the vessel 10 at its top. The refuse materials S sink in the medium M to the bottom of the vessel 10, and into its discharge conduit 18, to a refuse or "batch" chamber 20, which may be of substantial capacity. For discharging the heavy separated matter or refuse, there is a gate or shut-off valve 21 in the conduit 18, just above the refuse chamber 20, and just beneath the chamber 20 there is a gate or discharge valve 22. Below this valve 22 there may be a delivery conduit or chute 23 for the discharged refuse. Any sand (and water) passing off with the separated refuse materials S discharged through the gate valves 21, 22 may be separated therefrom and (ultimately) returned to the vessel 10 as through the pipe 16 aforementioned. Valve-controlled water supply pipes 24, 24 are shown connected to the conduit 18, just above the valve 21, and through these water may be continually supplied to assist in maintaining fluidity of the separating medium M. There is a water supply pipe connection 25 (Fig. II) to the upper portion of the chamber 20, controlled by a valve 26. There is also shown a pipe or conduit 27 extending upward from the chamber 20 to an open air vent at 28, which may serve to vent the chamber 20 of air when water is being run into it from pipe 25. In the apparatus as heretofore used, the pipe 27 terminates at the vent 28, which is placed high enough above the liquid level in the vessel 10 to prevent any considerable upsurge of water in said pipe. The downward extension of the pipe 27 beyond the air vent 28, as here shown, will be explained hereinafter.

As thus far described, the apparatus is well known in the art. In its operation, coal and accompanying refuse are continually run in at the chute 13, and are continuously separated. The gate valve 21 is kept closed until it is desired to discharge the separated refuse that has accumulated in the vessel 10 and in conduit 18, above said valve. The valve 22 being also closed, and the chamber 20 full of water (supplied from the pipe 25), the valve 21 is opened, allowing the refuse material S above this valve to descend by gravity into the chamber 20, as shown in Figs. I and II.

The descent of this heavy refuse into the water filled chamber 20 necessarily displaces a corresponding amount of water. Consequently, more or less water ascends through the conduit 18 as the refuse descends into the refuse chamber. This upflow of water in the conduit 18 not only tends to carry upward the grains of sand interspersed amongst the refuse particles,—which is in itself an advantage,—but is even vigorous enough to carry upward the smaller particles of the refuse where there is wide diversity in particle size. In this way a considerable part of the smaller refuse particles, under certain conditions, may not be discharged into refuse chamber 20 at all.

I have discovered a way of improving the operation of such systems by preventing or mitigating the sudden upflow of water from the chamber 20 through the conduit 18 (as above described) when the valve 21 is opened to discharge the separated heavy matter. This I accomplish by permitting relatively easy outflow or escape of the water displaced from the chamber 20 by the incoming refuse,—providing for this purpose a suitable avenue such as a conduit extending upward from said chamber 20. Of course the avenue thus provided for the outflow of water from the chamber 20 must offer a resistance to such outflow at least substantially equivalent to the hydrostatic head in the vessel 10, in order to prevent objectionable discharge of water due merely to unbalanced excess of such head over such resistance. Thus there will not be any objectionably vigorous upflow in the conduit 18. It is not necessary, however, to complicate the apparatus with an added pipe: on the contrary, I prefer to combine this function of water-outflow and discharge with that of air-venting the chamber 20 when it is being filled with water from the pipe 25, as already described. Or, to state the matter in other words, I may make the pipe 27, already described, large enough for the required outflow of water, and may extend it only to such height (above the liquid level in the vessel 10) as will permit the desired outflow or discharge of water through it under the impulse of the refuse descending into the chamber 20, while preferably precluding objectionable discharge of water due to the mere unbalanced hydrostatic head of the sand-and-water mixture in the vessel 10. The discharge of water through the pipe 27 should at any rate be controlled so as to prevent substantial or objectionable downflow in the outlet conduit 18, which may be as undesirable as an upflow. As the flow of water in the conduit 27 tends to carry some sand, which it is undesirable to lose, provision is preferably made for recovering it or returning it to the system. A simple way of doing this is to have the pipe 27 discharge into the vessel 10 as shown.

In the form of apparatus shown in Figs. I and II, the conduit 27 extends to a substantial height above the liquid level in the vessel 10 and makes a U-bend 30, and its return leg 31 opens and discharges into the lateral extension 17 of said vessel, through an opening in its top or cover plate 32. An air vent opening 28 such as already mentioned may be provided at the crest of the U-bend 30. As here shown, the U-bend 30 is a separate structure or piping assembly, movable up and down to vary and adjust the effective height or extent of the conduit 27 above the liquid in the vessel 10. To permit this, the legs of the U 30 telescope in suitably enlarged sections 33 of the conduit 27, with packing glands 34 to make air and liquid-tight joints: see Fig. III. By this adjustment, the effective height or crest and discharge capacity of the conduit 27 are controlled and varied, without materially affecting its air discharge capacity or its action as an air vent. Such adjustment may serve (inter alia) to take care of changes in the density or specific gravity of the separation liquid used in the vessel 10, or of the volume of separated material to be discharged into chamber 20 each time, etc. Also, and possibly still more important, it permits of properly controlling and regulating the upflow in the conduit 18, to an amount which will be unobjectionable, while at the same time minimizing the discharge through the conduit 27 into the top of the vessel 10. Thus a suitable gentle, harmless (or even beneficial) upflow in the conduit 18 can be insured at all times without ever discharging an objectionable amount of water into the top of the vessel 10. In other words, the upflow in the conduit 18a and the discharge through the conduit 27a may be "balanced" or harmonized to obtain maximum improvement with minimum disadvantage.

In the apparatus shown in Fig. IV, substantially similar results are obtained by a different mode of adjustment: i. e., the legs of the U 30a are fixed and extend to the maximum desired height, with the air-vent opening 28a at the crest; and a number of valved by-pass connections 35 between the U legs are provided, at different levels. Obviously, the lowest of these by-passes 35 that is open determines the effective height and the liquid-discharge capacity of the conduit 27a, without materially affecting its air discharge capacity.

Fig. V illustrates a simple form of construction in which the return leg 31b of the conduit 27b consists of short removable interjointed sections 36. To the top of this return leg 31b is connected an open vessel 37 whereto is also connected the rest of the conduit 27b, which may be of flexible hose to permit the height of the vessel 37 to be adjusted and varied by adding or removing sections in the return leg 31b,—as suggested in dot-and-dash lines. The conduit 27b is shown as extending and opening in the vessel 37 substantially above its bottom, to facilitate venting of air at this point without interference from any liquid in said vessel. Means of suspension for supporting the vessel 37 are indicated by a bail 38.

Fig. VI illustrates a simplified device (resembling that of Fig. IV) in which the U-bend 30c of the conduit 27c has no air vent opening, but is provided with a regulating throttle valve 40 for varying its discharge capacity and thus controlling the discharge of water therefrom into the vessel 10c. Air is also vented through the valve 40; for in general any opening sufficient for the desired discharge of liquid will also suffice for discharge of air.

It is obvious that (in analogy to Fig. V) the liquid discharge capacity of the conduit 27c might be controlled by fixed calibration: e. g., by including therein a section or opening of fixed size, determined as correct (for given conditions of operation) by experience or by calculation, instead of a valve such as 40.

In Figs. IV, V, and VI, various parts and features are marked with the same reference charters as in Figs. I–III, with the suffixes a, b, and c, respectively, as a means of dispensing with repetitive description.

Having thus described my invention, I claim:

1. In the separation of materials of different specific gravities with the aid of a separating liquid in a vessel having a discharge conduit and refuse chamber, provided with shut-off and discharge valves, for discharging separated heavier material from the lower portion of the vessel, and also provided with means for supplying water to said refuse chamber between said valves preparatory to the passing of the separated heavy material through the first of said valves, the improvement which comprises permitting outflow of displaced water from said refuse chamber, against a resistance to such outflow at least substantially equivalent to the hydrostatic head in the vessel, and during the passage of said material into the chamber through the first valve, in such quantity as to obviate objectionable upflow of displaced water through said discharge conduit.

2. In the separation of materials of different specific gravities with the aid of a separating liquid in a vessel having a discharge conduit and refuse chamber, provided with shut-off and discharge valves, for discharging separated heavier material from the lower portion of the vessel, and also provided with means for supplying water to said refuse chamber between said valves preparatory to the passing of the separated heavy material through the first of said valves, the improvement which comprises discharging and returning displaced water from said refuse chamber into said vessel, during the passage of said material through the first valve, against a resistance to such outflow at least substantially equivalent to the hydrostatic head in the vessel, and in an amount so controlled as to permit no more than an unobjectionable upflow of displaced water through said discharge conduit.

3. In apparatus for separating materials of different specific gravities with the aid of a separating liquid, the combination with a separating vessel and means for supplying thereto the mingled materials to be separated, and for discharging the separated lighter material from its upper portion; a discharge conduit and refuse chamber, provided with shut-off and discharge valves, for discharging separated heavier material from the lower portion of said vessel; and means for supplying liquid to said refuse chamber; of a conduit extending upward from said chamber permitting discharge of displaced liquid therefrom, when a batch of material is passed into the refuse chamber through said shut-off valve, in such quantity as to obviate objectionable upflow of displaced liquid through the first mentioned discharge conduit, and offering a resistance to such outflow at least substantially equivalent to the hydrostatic head in the vessel, for controlling such outflow of liquid as to prevent objectionable hydrostatic flow from the vessel through said conduit.

4. In apparatus for separating materials of different specific gravities with the aid of a separating liquid, the combination with a separating vessel and mean for supplying thereto the mingled materials to be separated, and for discharging the separated lighter material from its upper portion; a discharge conduit and refuse chamber, provided with shut-off and discharge valves, for discharging separated heavier material from the lower portion of said vessel; and means for supplying liquid to said refuse chamber; of an outflow conduit extending upward from said chamber above the liquid level in said vessel, and providing for outflow of displaced liquid from said chamber, when a batch of material is passed into the refuse chamber through said shut-off valve, in such quantity as to prevent objectionable upflow of displaced water through said discharge conduit, and including means for controlling and limiting such outflow to an amount sufficient for this purpose.

5. In apparatus for separating materials of different specific gravities with the aid of a separating liquid, the combination with a separating vessel and means for supplying thereto the mingled materials to be separated, and for discharging the separated lighter material from its upper portion; a discharge conduit and refuse chamber, provided with shut-off and discharge valves, for discharging separated heavier material from the lower portion of said vessel; and means for supplying liquid to said refuse chamber; of a conduit extending upward from said chamber, permitting discharge of displaced liquid therefrom when a batch of material is passed into the chamber through said shut-off valve in such quantity as to obviate objectionable upflow of displaced liquid through the first mentioned discharge conduit, and offering a resistance to such outflow at least substantially equivalent to the hydrostatic head in the vessel; and means for varying and adjusting the liquid flow capacity of said conduit.

6. In apparatus for separating materials of different specific gravities with the aid of a separating liquid, the combination with a separating vessel and means for supplying thereto the mingled materials to be separated, and for discharging the separated lighter material from its upper portion; a discharge conduit and refuse chamber, provided with shut-off and discharge valves, for discharging separated heavier material from the lower portion of said vessel; and means for supplying liquid to said refuse chamber; of an outflow conduit extending upward from said chamber above the liquid level in said vessel, and discharging into the latter; and means for varying the effective height or crest of said outflow conduit above said liquid level, and the discharge of liquid therethrough.

7. In apparatus for separating materials of different specific gravities with the aid of a separating liquid, the combination with a separating vessel and means for supplying thereto the mingled materials to be separated, and for discharging the separated lighter material from its upper portion; a discharge conduit and refuse chamber, provided with shut-off and discharge valves, for discharging separated heavier material from the lower portion of said vessel; and means for supplying liquid to said refuse chamber; of an outflow conduit extending upward from said chamber, providing against a resistance to such outflow at least substantially equivalent to the hydrostatic head in the vessel, and for the discharge of air from said chamber and also for the outflow of liquid in such quantity as to obviate objectionable upflow of displaced liquid through said discharge conduit; and means for varying and adjusting the liquid flow capacity of said conduit without affecting its air discharge capacity.

8. In apparatus for separating materials of different specific gravities with the aid of a separating liquid, the combination with a separating vessel and means for supplying thereto the mingled materials to be separated, and for discharging the separated lighter material from its upper portion; a discharge conduit and refuse chamber, provided with shut-off and discharge valves, for discharging separated heavier material from the lower portion of said vessel; and means for supplying liquid to said refuse chamber; of a conduit extending upward from said chamber above the liquid level in said vessel, and providing for the discharge of air and of liquid in such quantity as to obviate objectionable upflow of displaced liquid through the first mentioned discharge conduit; and means for varying and adjusting the effective height or crest of said outflow conduit above said liquid level, and thus regulating its liquid flow capacity substantially without affecting the discharge of air therethrough.

9. In apparatus for separating materials of different specific gravities with the aid of a separating liquid, the combination with a separating vessel and means for supplying thereto the mingled materials to be separated, and for discharging the separated lighter material from its upper portion; a discharge conduit and refuse chamber, provided with shut-off and discharge valves, for discharging separated heavier material from the lower portion of said vessel; and means for supplying liquid to said refuse chamber; of a discharge conduit extending upward from said chamber to a crest above the liquid level in said vessel, said conduit being of a capacity and extending to a height which permit and limit discharge of liquid therethrough to an amount sufficient to prevent objectionable upflow in the first mentioned discharge conduit.

MARCUS A. WALKER.